United States Patent Office 2,697,696
Patented Dec. 21, 1954

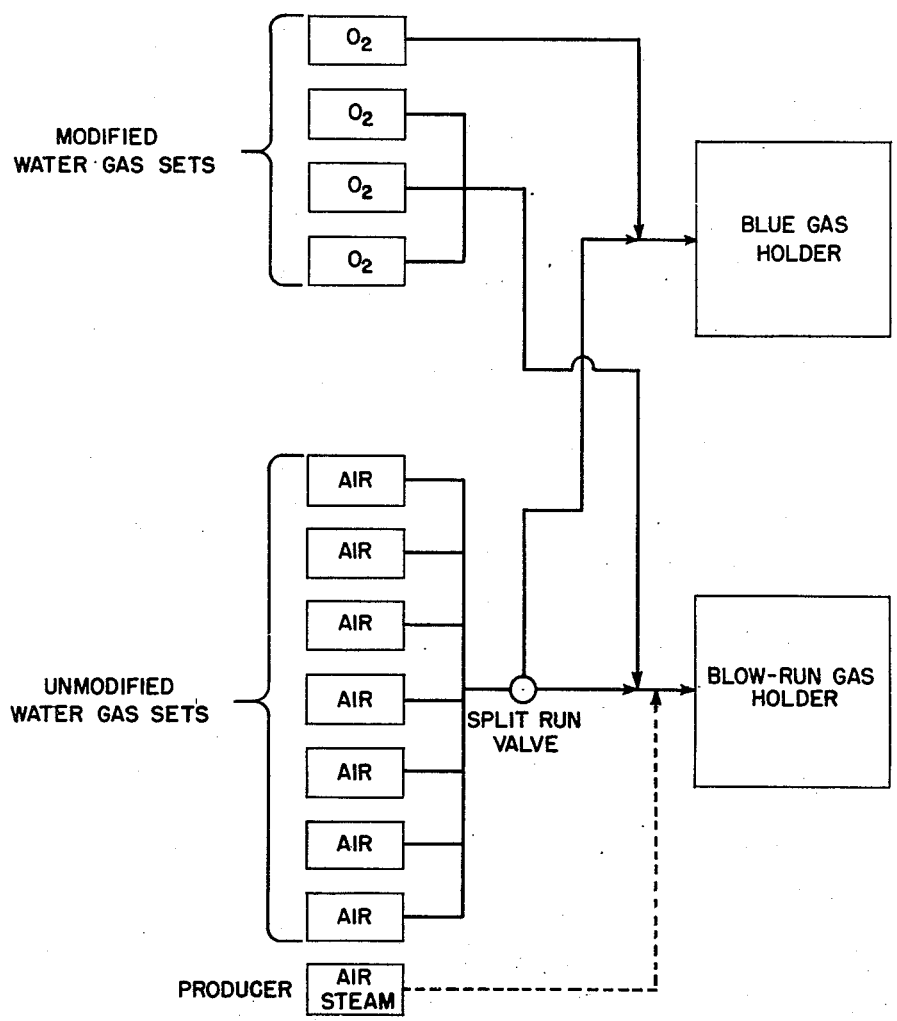

2,697,696

PREPARATION OF SYNTHESIS GASES

Douglas V. Moses, Charleston, W. Va., and Victor R. Thayer, Wilmington, Del., assignors to E. I. du Pont de Nemours & Company, Wilmington, Del., a corporation of Delaware Application July 26, 1949, Serial No. 106,936

12 Claims. (Cl. 252—373)

This invention relates to a process for the preparation of synthesis gases by the water gas reaction and is more particularly directed to the preparation of hydrogen, gaseous mixtures containing hydrogen and nitrogen, and gaseous mixtures containing hydrogen and carbon monoxide by the combination of water gas reactions in which the solid carbonaceous material is reacted with oxygen and air in separate retorts and the synthesis gases combined.

The gasification of coke with oxygen or enriched air has long attracted interest due to its high thermal efficiency. It has been practiced extensively in Germany and in one large plant in America at Trail, B. C. In addition to the increase of thermal and physical efficiencies which result in a 30 to 40% reduction in coke required per unit of $H_2+CO$ made, up to 50% increase in the capacity of a generator, major decrease in maintenance costs, and greater than expected flexibility with the respect to product gas composition has been demonstrated.

The less efficient water gas reaction, commonly used to produce manufactured gas from coke, involves blasting the coke with air and steam alternately, the air heating the coke to incandescence, the steam arresting the burning process and supplying a portion of the hydrogen and oxygen which react with the carbon to produce monoxide and hydrogen. For the preparation of ordinary gas, the gases produced when blasting the coke with air are allowed to escape as these gases contain principally carbon dioxide and nitrogen. When the blast is cut off and steam introduced into the incandescent bed, the gases produced, mainly hydrogen and carbon monoxide, are collected for use. The inefficiency of such a water gas reaction is due to the fact that a part of the operation time is involved in blasting the fuel bed to raise its temperature, and during this blasting operation the gases are discharged to the atmosphere. When pure oxygen is used as the blasting gas, in place of air, no gases are wasted nor is alternate heating of the fuel bed followed by treatment with steam required for large amounts of nitrogen are not present during this blasting operation; the steam can be introduced with the oxygen and the reaction conducted continuously.

Disadvantages have been encountered, however, in operating the water gas reaction with substantially pure oxygen, these disadvantages involving, inter alia, the production of a gas having a high carbon dioxide content and also in the production of a gas containing substantially no nitrogen. The latter gas should be present in suitable amounts if the synthesis gas is to be used in the manufacture of ammonia by high pressure synthesis from nitrogen and hydrogen. Moreover, the more than 21% carbon dioxide content of this gas is disadvantageous for the reason that gaseous mixtures containing this quantity of carbon dioxide cannot be purified economically in the "thylox" sulfur removal process, hereinafter particularized.

An object of the present invention is to provide an improved process for the preparation of water gas by the combination of a cyclic water gas reaction employing air, on the one hand, and a similar process employing substantially pure oxygen, on the other. Another object of the invention is to provide a synthesis gas by combining the gases from air and oxygen water gas reactions, i. e., from a conventional air-blast, steam-run water gas reaction and a continuous 90% oxygen-steam reaction hereinafter called the modified water gas reaction. Still another object is to provide a gaseous mixture by a combination of a portion of the steam-run gas from the water-gas reaction and the total gas from the modified water gas reaction. Yet another object is to provide a process for the preparation of synthesis gases, which contain less than 15% carbon dioxide, from the water gas reaction and the modified water gas reaction. A further object is to provide a process whereby gases produced in accord with the aforesaid processes can be rendered substantially sulfur free. Other objects and advantages of the invention will hereinafter appear.

In accord with the process of this invention, synthesis gas mixtures are prepared by combining the gas streams from the water gas and the modified water gas reactions. In general, the process may be conducted by carrying out the water gas reaction in a plurality of generators, some of which are operated with air, cyclic or producer generators, others with oxygen enriched air or oxygen of 90% or higher purity on a bone dry basis. In order to obtain from such generators a purifiable gas of hydrogen and carbon monoxide, the "heart-cut," i. e. low nitrogen blue gas from the last half of the steam run from a plurality of water gas generators is mixed with all of the gas from one or more modified water gas generators. By operating in this manner a blue gas can be obtained which is low in carbon dioxide and nitrogen content and which can be readily purified substantially free from sulfur to give a synthesis gas suitable for many organic synthesis reactions such as the Fischer Tropsch and methanol synthesis. When the carbon monoxide content of such a gas has been shifted to carbon dioxide through a suitable shifter operation and the carbon dioxide removed by known means, the augmented hydrogen content of the gas can be used for hydrogenation processes generally. Furthermore, the first half of the steam run from the plurality of water-gas generators is not wasted, but is combined with all of the gas made by a number of modified water gas generators to give a blow run gas containing hydrogen and carbon monoxide and sufficient nitrogen for use in the ammonia synthesis with such low amounts of carbon dioxide that this gas can also be readily purified free from sulfur.

A major problem in the operation of water-gas generators is in their production of a synthesis gas with satisfactory control of $H_2/N_2$ ratio especially during operations when there is a fluctuation in demand. One of the features of the invention relates to obviating such difficulties by operating modified water-gas generators with producer and cyclic sets. The producer and cyclic sets operate respectively by the continuous introduction of a controlled ratio of steam and air into the firebed and by the alternate introduction of air followed by steam into the firebed. Variations in the $H_2/N_2$ ratio, particularly for ammonia synthesis, can be avoided by the use of one or more producer sets in combination with the necessary number of cyclic sets and modified water-gas sets, the gases being combined to provide the desired $H_2/N_2$ ratio.

The attached drawing illustrates diagrammatically one method of distributing the gas between water-gas generators and modified water-gas generators. In the drawing it will be noted that all of the gas from a single modified water gas generator, identified by symbol "$O_2$" is passed to a blue-gas holder; while the steam-run gas, identified by the word "air," from seven water-gas generators is likewise passed to this holder. Not all of the steam-run gas from the water-gas generators is used, however, but on the contrary only about the last ¾ or ½ of the steam-run gas. In other words, the steam-run gas is split, only a portion of it combined with all the gas from a modified water-gas generator. Likewise, it will be noted that a blow-run gas is produced by all of the gas from three modified water-gas generators, this gas being combined with the first ¼ to ½ portion of the steam-run gas from the seven water-gas generators.

If desired the composite blow-run gas composition can be further controlled by gas from one or more producer sets, identified on the drawing as "Air-Steam," which can be depended on to provide a fairly constant gas composition, since such a set operates on the simultaneous and continuous introduction of steam and air into the firebed. This constant feed of steam and air is adjustable as to amount and as to ratio of steam/air, by means of which the $H_2/N_2$ ratio demanded by the particular synthesis or storage requirement can be satisfied, the gas from this source being continuously or intermittently charged into the Blow-Run Gas Holder.

One feature of the invention involves operating jointly water-gas and modified water-gas generators in such a manner as to produce synthesis gases having a sufficiently low carbon dioxide content to make it possible to purify them economically from the sulfur content produced during the generation of the gas. An outstanding process now in commercial use for the removal of sulfur from such gases, called the "thylox" process, involves scrubbing the sulfur contaminated gas with derivatives of metals in solution, the sulfides of which are water soluble, the scrubbing operation being conducted in the presence of an alkaline medium. The preferred metals used are those of the tin group, embracing more particularly arsenic, antimony and tin. In alkaline solutions these metals, their acids or salts, are capable of absorbing hydrogen sulfide and allowing regeneration of absorbed sulfur in elemental form under the influence of an oxidizing agent such as air. Prior to use these metals are sulfided and oxidized in accord with the art, the standard scrubbing solution being an oxidized and sulfided alkaline solution of arsenic or the equivalent of a solution containing up to 2% $As_2O_3$. This scrubbing process is described in the H. A. Gollmar Patent 1,719,672. These sulfur removal agents are, however, limited in their utility it has been found, for when used for the removal of sulfur from a gas the efficiency of the solution decreases rapidly if there is more than 15% carbon dioxide present in the gas. One of the outstanding advantages of the combination of water-gas and modified water-gas generators is that the combination of split-run gases provides both blue-run and blow-run gas containing less than 15% carbon dioxide which can be purified from its sulfur and hydrogen sulfide content by this established sulfur removal process.

Further embodiments of the invention are illustrated by the examples in which parts are by weight unless otherwise indicated.

*Example 1.*—The conventional water-gas process consists of repeated cycles of approximately two minutes in length, each cycle made up of several parts, usually six in number, as follows, in the order in which they appear in the cycle:

1. The Blow

The primary purpose of the Blow is the heating up of the firebed. It lasts approximately 53 seconds and comprises most of the period when air is blown through the firebed, burning some of the coke and thereby providing heat to raise the firebed temperature. During the Blow, the stack valve is kept open, allowing the gas from the reaction of the air and coke, called Blast Gas, to be released intentionally to the atmosphere, since the gas contains only a small percentage of valuable constituents.

2. The Blow Run

The Blow Run, following the Blow, is usually very short, lasting only 1 to 2 seconds and is accomplished simply by closing the stack valve at the end of the Blow; and allowing the air to continue to flow through the firebed. By closing the stack valve, the Blast Gas made during the Blow Run, which is composed of about 75% nitrogen, is caused to flow into the gas mains, and is added to the Blow Run Gas System, thus providing some of the higher nitrogen content which distinguishes Blow Run Gas from Blue Gas. Since the Blow Run can easily be varied in length of time, it is used as a means of adjusting the total amount of nitrogen in the Blow Run Gas. The temperature of the firebed at the end of the Blow Run is 2800–2900° F. Composition (per cent by volume) of the Blast Gas is approximately:

| | |
|---|---|
| $CO_2$ | 15.0 |
| $H_2$ | 6.5 |
| $CO$ | 4.0 |
| $N_2$ | 74.0 |
| $O_2$ | 0.2 |
| $CH_4$ | 0.3 |

3. The First Up Run

The whole steam period of the cycle is known as the Run and usually lasts about 65 seconds. The Run is divided into three parts, during the first and last of which the steam flows upward through the firebed, while during the middle part, it flows downward. The stack valve is kept closed during the Run and every effort is made to save all the gas formed during the Run.

During the First Up Run, which lasts about 25 seconds, the steam flows upward through the firebed. The Blow Run must always be followed by an upward steaming of the firebed because a downward steam flow would cause the resulting Water Gas to mix with the small amount of unburned air left at the bottom of the generator and cause an explosion. The steam of the First Up Run mixes harmlessly with this air and carries it up through the firebed, where it burns a small amount of coke during the very beginning of making Water Gas on the Run. During the First Up Run the temperature of the firebed is comparatively high and consequently more of the steam reacts with the coke than on the following parts of the Run, thus making more gas per quantity of steam used.

4. The Down Run

During the Down Run, which follows the First Up Run, the steam flows downward through the firebed, this part of the cycle lasting about 33 seconds. If the steam were at all times passed upward through the firebed in the most convenient manner, the highest temperature would occur near the upper surface of the firebed (since the air flow is always upward). Having the hottest zone near the top of the firebed causes an unbalanced bed, very hot on top and much cooler in the middle and lower zones, resulting in excessive losses of unburned coke in the ash and excessive heat losses in the gases and unreacted steam leaving the generator. The Down Run keeps the hot zones from working toward the top of the firebed. During the Down Run, the firebed temperature continues to fall so that the rate at which water gas forms drops correspondingly. During the Down Run the generator is charged with coke.

5. The Second Up Run

The Second Up Run, following the Down Run, is a comparatively short period, 7–8 seconds; during which steam again passes up through the firebed. The reason for returning to an upward steam flow is as follows: The next part of the cycle requires the stopping of the steam flow and the starting of an air flow up through the firebed. If this were to take place directly following the Down Run, the incoming air would mix with the remanents of the Down Run Gas left at the bottom of the generator and would cause an explosion. The steam on the Second Up Run sweeps the remaining Down Run Gas up out of the bottom of the generator and the air flow of the next cycle part can then be started, mixing harmlessly with the steam. The temperature of the firebed at the end of the Run is approximately 1000° F.

Composition of the Blue Gas made during the Run is (in percent by volume) approximately:

| | |
|---|---|
| $CO_2$ | 6.7 |
| $H_2$ | 52.1 |
| $CO$ | 38.0 |
| $N_2$ | 2.5 |
| $O_2$ | 0.2 |
| $CH_4$ | 0.5 |

6. The Blast Purge

This is the last part of the cycle and lasts 7–8 seconds. The steam flow of the Second Up Run is stopped and air flow is started keeping the stack valve closed. The purpose of the Blast Purge is to sweep into the gas mains the last portions of water gas and unreacted steam which fill the generator spaces at the end of the Second Up Run so that the valuable gas will not be lost to the atmosphere when the stack valve opens at the start of the Blow of the next cycle. Thus its primary purpose is prevention of loss of valuable gas but incidentally, some of the Blast Gas formed mixes with the water gas saved, providing some of the nitrogen for the Blow Run Gas. The Blast Purge completes the cycle and is followed by the Blow as outlined above.

In accordance with a preferred operation of the above process, the Blow Run Gas, which is high in nitrogen, and the Blue Gas, which is low in nitrogen content, are made on the same Gas Sets. In normal operation the gas make is split into two fractions by timed operation of a valve, see drawing, which acts as a two-way gate and sends the gas to one or the other of the two systems (Blue Gas or Blow Run Gas) by opening one gate and closing the other. This is called split run operation and the valve is known as the Split Run Valve. As a general practice, the fraction of gas made on the Blow Run and the first part of the First Up Run, containing more than 20% and less than 30% by volume of nitrogen, is sent to Blow Run Gas. At a point along the Frst Up Run, which varies with the ratio of Blue Gas and Blow Run Gas required in the particular plant operation, the Split Run Valve changes position and sends the gas which then contains but little nitrogen, less than 5% and preferably less than 2%, to the Blue Gas System. The gas made during this period is sometimes referred to as the "heart cut" of the cycle. At a variable point along the Second Up Run, the valve again reverses and sends the gas made during this and the Blast Purge to the Blow Run System. The timing of valve reversals may be varied according to production demands so that more or less of either gas is made. Separate systems are provided for handling the two gases and care is taken to prevent their mixing due to leaky connections between the two systems.

*Example 2.*—The operation of the modified water-gas process is as follows: A mixture of oxygen preheated to a temperature between 200° and 240° F. and preferably between 210° and 225° F., is passed continuously upward through a generator firebed. Steam is also forced through the firebed at a pressure between 7 and 20 p. s. i. q. and preferably at a pressure between 10 and 15 p. s. i. q., the steam being respectively at temperatures between 235 to 260° F. and 240 to 250° F. The composition of the gas made is controlled by the steam-oxygen ratio fed to the generator, the higher the oxygen content the higher the temperature and vice versa. The ratio may vary between 0.10/0.22 and preferably 0.12/0.15 steam to oxygen. The temperature of the firebed is maintained by the heat generated from the burning of the oxygen and the position of the reaction zone in the generator is maintained by the continuous removal of ash from the bottom and the intermittent or continuous addition of coke to the top of the generator. The temperature of the firebed is held between about 1800–2000° F. A representative analysis (per cent by volume) of the gas made is:

$CO_2$ ---------------------------------------- 22.0
$H_2$ ----------------------------------------- 40.3
$CO$ ----------------------------------------- 36.0
$N_2$ ----------------------------------------- 1.0
$O_2$ ----------------------------------------- 0.2
$CH_4$ ---------------------------------------- 0.5

*Example 3.*—The purification of the mixed Blow Run Gas is accomplished in the "thylox" process as follows:

The gas containing less than 15% carbon dioxide, a composite of about 45% Blue Run Gas and about 55% modified water-gas, is first compressed to 45–50 inches of water pressure to overcome the pressure drop of the "thylox" process, and then scrubbed with alkaline arsenic "thylox" solution to decrease the hydrogen sulfide content from about 125 grains to about 1–2 grains per 100 cu. ft. of gas. The scrubbing solution contains an optimum concentration of 7–8 grains of arsenic per liter at pH concentration of 7.8–8.0. Regeneration of fouled arsenic solution is effected by agitation with air. The sulfur liberated in the regeneration may be recovered, purified and sold as brimstone.

*Example 4.*—In a commercial "thylox" process normally loaded with 32,650 MCF/D (thousand cubic feet of gas per day S. T. D.) of a Blow Run Gas and in another process loaded with 54,300 MCF/D of Blue Gas and an inlet $H_2S$ concentration of about 130 grains/100 CF, the quantitative effect of the $CO_2$ concentration in the inlet gas on arsenic carrying capacity and $H_2S$ clean-up capacity is shown in Table I.

TABLE I

| (A) | (B) | (C) |
|---|---|---|
| $CO_2$ Content of Gas Processed, Percent | Arsenic Carrying Capacity of "thylox" solution as a Function of $CO_2$ Concentration in Gas Processes (Grams of Equiv. $As_2O_3$ per liter) | Average $H_2S$ Leakage as a function of the Arsenic Carrying Capacity of "thylox" solution (Grains 100 CF) |
| 8 | 8 | 0.5 |
| 15 | 7 | 5 |
| 22 | 6 | 10 |
| 29 | 5 | 16 |
| 36 | 4 | 23 |

From the table it is apparent that as the $CO_2$ content of the gas increases the arsenic carrying capacity of the "thylox" solution as a function of $CO_2$ concentration in gas processed decreases, as does also the sulfur removal capacity of the solution.

While it is economically advantageous to operate the water-gas and modified water-gas generators simultaneously to produce a satisfactory blue-gas and a satisfactory blow-run gas, this result may likewise be accomplished in accord with the invention and without departing therefrom by operating the generators alternatively, although when operating in this manner a separate mixing step is necessary to provide a gas having the desired uniform composition. Efficient mixing is provided, when operating the converters simultaneously, by passing the gases through the same header to the gas holder. Alternatively the gas from a modified water-gas generator may be stored in a gas holder and the gas from the split "heart-run" of the water-gas generator in another gas holder, the gases being mixed just prior to their sulfur removal by the aforesaid alkaline metal solution.

The drawing illustrates the combination of all of the gas from a single modified water-gas generator with the last half of the low nitrogen gas, from seven water-gas generators, i. e., a ratio of about 1:7 to give a purifiable blue-gas. This ratio can be varied from 1:5 to 1:9. If a greater portion of the water-gas is used, say ¾ of the run, this ratio can be lowered to 1:4.

Similarly a purifiable blow-run gas can be produced by a ratio of 7:3 if the first half, high nitrogen gas, from seven water-gas converters is combined with the gaseous mixture from these modified water gas generators. This ratio can be similarly varied from 1:2 to 1:3.

By the combined operation in accord with the process of this invention, it is possible to produce a gas suitable for the production of pure hydrogen, a gas having a satisfactory hydrogen and carbon monoxide content for the Fischer Tropsch and methanol synthesis and a gas of proper nitrogen and hydrogen content for ammonia synthesis, which gases are sulfur free. The disadvantages, accordingly, emanating from the use of substantially pure oxygen has been overcome by the process of this invention and the advantages of the oxygen water-gas generator coupled with the advantages of the air-blast steam-run generation of synthesis gases.

We claim:

1. A process for the preparation of a synthesis gas wherein a gaseous mixture from a modified water-gas reaction, using as the oxidizing gas a gas of the group consisting of air rich in oxygen and at least 90% oxygen, is combined with a portion of the gaseous mixture from a water-gas reaction, containing low nitrogen blue gas from the last half of the steam run of said reaction, which comprises in the water-gas reaction gasifying a solid carbonaceous material by heating it to incandescence with air and thereafter forcing steam through the incandescent material, in a modified water-gas reaction gasifying a solid carbonaceous material by heating it with an oxidizing gas of the group consisting of air rich in oxygen and at least 90% oxygen in the presence of steam, mixing the gaseous mixture of the modified water-gas reaction with a portion of the gaseous mixture of the water-gas reaction, containing low nitrogen blue gas from the last half of the steam run of said reaction, to give a gaseous mixture containing less than 15% carbon dioxide, and scrubbing the resulting gaseous mixture with a sulfided and oxidized alkaline solution of a metal of the tin group whereby the sulfur content of the purified gas is not more than approximately 5 grains of hydrogen sulfide per 100 cubic feet.

2. The process of claim 1 in which the modified water-gas reaction is conducted at a temperature between about 1800 and about 2000° F.

3. The process of claim 1 in which the water-gas reaction is conducted at a temperature up to between 2800 and 2900° F. and the modified water-gas reaction is conducted at a temperature between 1800 and 2000° F.

4. A process for the preparation of a synthesis gas wherein a gaseous mixture from a modified water-gas reaction, using as the oxidizing gas a gas of the group consisting of enriched air and at least 90% oxygen, is combined with a portion of the gaseous mixture from a water-gas reaction which comprises, in the water-gas reaction, gasifying a solid carbonaceous material by heating it to incandescence with air and thereafter forcing steam through the incandescent material, in the modified water-gas reaction gasifying a solid carbonaceous material by heating it with at least 90% oxygen in the presence of steam, splitting the gaseous mixture during the steaming operation of the water-gas reaction, combining the low nitrogen portion of that split steam-run gaseous mixture with the gaseous mixture produced by the modified water-gas reaction to form blue-gas containing less than 15% carbon dioxide, and scrubbing the resulting gaseous mixture with a sulfided and oxidized alkaline solution of a metal of the tin group whereby the sulfur content of the purified gas is not more than approximately 5 grains of hydrogen sulfide per 100 cubic feet.

5. The process of claim 4 in which the modified water-gas reaction is conducted at a temperature between about 1800 and about 2000° F.

6. A process for the preparation of a synthesis gas wherein a gaseous mixture from a modified water-gas reaction, using as the oxidizing gas a gas of the group consisting of enriched air and at least 90% oxygen, is combined with a portion of the gaseous mixture from a water-gas reaction which comprises, in the water-gas reaction, gasifying a solid carbonaceous material by heating it to incandescence with air and thereafter forcing steam through the incandescent material, in the modified water-gas reaction, gasifying a solid carbonaceous material by heating it with an oxidizing gas consisting of at least 90% oxygen in the presence of steam, splitting the gaseous mixture during the steam-run of the water-gas reaction, combining the high nitrogen portion of that split steam-run gaseous mixture with the gaseous mixture produced by the modified water-gas reaction to form a blow-run gas containing less than 15% carbon dioxide, and scrubbing the resulting gaseous mixture with a sulfided and oxidized alkaline solution of a metal of the tin group whereby the sulfur content of the purified gas is not more than approximately 5 grains of hydrogen sulfide per 100 cubic feet.

7. A process for the preparation of a synthesis gas wherein a gaseous mixture from a modified water-gas reaction, using as the oxidizing gas a gas of the group consisting of enriched air and at least 90% oxygen, is combined with a portion of the gaseous mixture from a water-gas reaction which comprises, in the water-gas reaction, gasifying a solid carbonaceous material by heating it to incandescence with air and thereafter forcing steam through the incandescent material, in the modified water-gas reaction, gasifying a solid carbonaceous material by heating with an oxidizing gas consisting of at least 90% oxygen in the presence of steam, splitting the gaseous mixture during the steam-run of the water-gas reaction, combining the first portion of that split steam-run gaseous mixture with the gaseous mixture produced by the modified water-gas reaction to form a blow-run gas containing less than 15% carbon dioxide, and the last portion of that split steam-run gaseous mixture with the gaseous mixture produced by the modified water-gas reaction to form a blue-gas containing less than 15% carbon dioxide, and scrubbing the resulting gaseous mixture with a sulfided and oxidized alkaline solution of a metal of the tin group whereby the sulfur content of the purified gas is not more than approximately 5 grains of hydrogen sulfide per 100 cubic feet.

8. The process in accord with claim 4 in which the first $1/4$ to $1/2$, high nitrogen portion, of the gaseous mixture from the split steam-run from the water-gas reaction is combined with the gaseous mixture from the modified water-gas reaction to give a blow-run gas containing less than 15% carbon dioxide.

9. The process in accord with claim 4 in which the last $3/4$ to $1/2$, low nitrogen portion, of the gaseous mixture from the split steam-run from the water-gas reaction is combined with the gaseous mixture from the modified water-gas reaction to produce a blue-gas containing less than 15% carbon dioxide.

10. The process of claim 4 in which the first $1/4$ to $1/2$ of the gaseous mixture from the split steam-run of the water-gas reaction and the last $3/4$ to $1/2$ of that gaseous mixture are respectively added to gaseous mixtures produced by the modified water-gas reaction to form blow-run and blue-gas mixtures.

11. In a process for the preparation of a synthesis gas wherein a gaseous mixture from a modified water-gas reaction, using as the oxidizing gas a gas of the group consisting of air rich in oxygen and at least 90% oxygen, is combined with the gaseous mixture from a water-gas reaction, the steps which comprise gasifying in the water-gas reaction a solid carbonaceous material by heating it to incandescence with air and thereafter forcing steam through the incandescent material, gasifying in a modified water-gas reaction a solid carbonaceous material by heating it with an oxidizing gas of the group consisting of air rich in oxygen, and at least 90% oxygen, in the presence of steam, mixing the gaseous mixture of modified water-gas reaction with a gas from the water gas reaction selected from the group consisting of the blow run gas, and the low nitrogen blue gas from the last half of the steam run to give a composite gaseous mixture containing less than 15% carbon dioxide, and scrubbing the resulting gaseous mixture with a sulfided and oxidized alkaline solution of a metal of the tin group whereby the sulfur content of the purified gas is not more than approximately 5 grains of hydrogen sulfide per 100 cubic feet.

12. A process for the preparation of a synthesis gas wherein a gaseous mixture from a modified water gas reaction, using as the oxidizing gas a gas of the group consisting of enriched air and at least 90% oxygen, is combined with a portion of a gaseous mixture from a water gas reaction which comprises, in the water gas reaction, gasifying a solid carbonaceous material by heating it to incandescence with air and thereafter forcing steam through the incandescent material, in the modified water gas reaction gasifying a solid carbonaceous material by heating it in the presence of steam with an oxidizing gas consisting of at least 90% oxygen, splitting the gaseous mixture during the steam run of the water gas reaction and combining the low nitrogen portion of that split steam run gaseous mixture with the gaseous mixture produced by the modified water gas reaction to form a blue gas containing less than 15% carbon dioxide, the ratio of the modified water gas to the split steam run gas in the composite gaseous mixture being between 1:4 and 1:9.

References Cited in the file of this patent

UNITED STATES PATENTS

| Number | Name | Date |
|---|---|---|
| 2,264,427 | Asbury | Dec. 2, 1941 |

FOREIGN PATENTS

| Number | Country | Date |
|---|---|---|
| 480,820 | Great Britain | Mar. 1, 1938 |

OTHER REFERENCES

"Synthetic Petroleum from the Synthine Process" by Weil and Lane, published by Remsen Press Division, Chemical Publishing Co., Inc., New York, N. Y., 1948, page 9.

"Fuels and Their Combustion" by Haslam and Russell—by McGraw-Hill Book Co., Inc., New York and London, 1926, First Edition, pages 602 and 605–610.

"Gas Engineer's Handbook," published by McGraw-Hill Book Co., Inc., New York, First Edition, 1934, pages 285, 289 and 291–293.